United States Patent [19]

Kishima

[11] Patent Number: 4,668,588
[45] Date of Patent: May 26, 1987

[54] POLYCARBONATE MOLDED ARTICLES HAVING EXCELLENT WEATHER RESISTANCE AND ABRASION RESISTANCE AND A PROCESS FOR THE PREPARATION THEREOF

[75] Inventor: Yoshio Kishima, Kasukabe, Japan

[73] Assignee: Dainippon Plastics Co., Ltd., Osaka, Japan

[21] Appl. No.: 711,336

[22] Filed: Mar. 13, 1985

[30] Foreign Application Priority Data

Mar. 16, 1984 [JP] Japan .................................. 59-52011

[51] Int. Cl.$^4$ ................................. B32B 9/00
[52] U.S. Cl. ................................. 428/412; 428/423.1; 427/54.1; 427/393.5; 427/412
[58] Field of Search ................. 428/412, 423.1; 427/163, 54.1, 393.5, 412

[56] References Cited

U.S. PATENT DOCUMENTS

| 3,582,398 | 6/1971 | Ringler | 428/412 |
|---|---|---|---|
| 4,235,954 | 11/1980 | Humphrey | 427/163 |
| 4,399,192 | 8/1983 | Russell | 428/412 |
| 4,404,257 | 9/1983 | Olson | 428/412 |
| 4,410,594 | 10/1983 | Olson | 428/412 |
| 4,419,405 | 12/1983 | Ashby | 428/412 |
| 4,478,876 | 10/1984 | Chung | 428/412 |
| 4,491,508 | 1/1985 | Olson | 428/412 |
| 4,533,595 | 8/1985 | Olson et al. | 428/412 |
| 4,557,975 | 12/1985 | Moore | 428/412 |

FOREIGN PATENT DOCUMENTS 38056  3/1984  Japan .................................. 428/412

Primary Examiner—Edith Buffalow
Attorney, Agent, or Firm—Armstrong, Nikaido, Marmelstein & Kubovcik

[57] ABSTRACT

Polycarbonate molded articles having excellent weather resistance and excellent abrasion resistance in which polycarbonate molded object is coated with an abrasion resistant cured layer comprising an ultraviolet ray setting paint, through a primer layer comprising a thermoplastic acrylic (or methacrylic) polymer containing 4–8% by weight of an ultraviolet ray absorbing agent, which are substantially transparent and particularly useful as wall materials for greenhouse, ceiling materials, partition wall materials, wall materials for sunroom, substitutes for windbreak glass and the like.

13 Claims, 2 Drawing Figures

POLYCARBONATE MOLDED ARTICLES HAVING EXCELLENT WEATHER RESISTANCE AND ABRASION RESISTANCE AND A PROCESS FOR THE PREPARATION THEREOF

BACKGROUND OF THE INVENTION

1. Field of the Invention

The present invention relates to polycarbonate molded articles and a process for the preparation thereof. More particularly, the invention relates to polycarbonate molded article having excellent weather resistance and excellent abrasion resistance, which are prepared by forming a protective layer on the surface of a polycarbonate molded object with an ultraviolet ray setting paint applied through a primer layer, and a process for the preparation of them.

2. Description of the prior art

In general, polycarbonates are superior in their transparency, molding characteristic, impact resistance and other respects, and so they are widely used in various fields. However, their big problem is their inferior weather resistance and poor abrasion resistance of surface compared with other materials.

To solve such problem, various proposals have been made. For example, processes for improving weather resistance are disclosed in Japanese Patent Publication No. Sho 44(1969)-29756, Japanese Patent Laid-open Nos. Sho 53(1978)-119985 and Sho 54(1979)-87774, etc. and processes for improving abrasion resisting property are disclosed in Japanese Patent Laid-open Nos. Sho 57(1982)-162728, Sho 57(1982)-42737 and Sho 54(1979)-11833, Japanese Patent Publication Nos. Sho 54(1979)-28429, Sho 54(1979)-28430, Sho 55(1980)-427 and Sho 54(1979)-37828, etc. In these processes an alkoxyl silane or an acrylic resin was used as the primer and the surface was further treated with an alkoxyl silane of thermosetting type, to make the surface hardness higher and improve the abrasion resisting property.

Further, a process using a product of an ultraviolet ray setting reaction as primer and forming a surface layer thereon with an organosiloxane of thermosetting type is disclosed in Japanese Patent Laid-open No. Sho 55(1980)-148158.

These processes, however, had a defect that a high setting temperature and a long time were required as conditions for curing the surface layer. When an organosiloxane of thermosetting type was used, an unfavorable phenomenon such as flushing was apt to occur depending on the conditions of painting because the organosiloxane easily absorbed the moisture in the air and, accordingly, it was necessary to perform the working under controlling the moisture, which induced a problem of high cost of equipments.

Besides the above-mentioned processes using a paint of thermosetting type, processes for improving the abrasion resistance of polycarbonate molded articles by applying an ultraviolet ray setting paint comprising, for example, a polyfunctional acrylic resin to the polycarbonate molding directly have been also proposed. For instance, a process of hardening by application of heat after the ultraviolet ray irradiation treatment has been proposed in Japanese Patent Laid-open No. Sho 57(1982)-61043 and a process for obtaining polycarbonate moldings having good abrasion resisting property by hardening by cross-linking a resin by means of a special reflection plate in Japanese Patent Publication No. Sho 58(1983)-12295, and materials for the ultraviolet ray setting paints have been disclosed by Japanese Patent Laid-open Nos. Sho 54(1979)-25941, Sho 54(1979)-60390 and Sho 56(1981)-82802, etc.

These ultraviolet ray setting type paints had the merits that the temperature for their curing by cross-linking was lower and the time for their curing by cross-linking was significantly shorter as compared with those necessary for the aforementioned thermosetting type paints.

However, the ultraviolet ray setting type paints had an inconvenience that, when they were applied to plastics, especially to polycarbonate resins, they were inferior in the weather resistance and could not withstand an outdoor use extending for a long time.

One of the purposes of the present invention resides in obtaining polycarbonate moldings having excellent weather resistance as well as excellent abrasion resistance by using such ultraviolet ray setting type paints.

In the case of thermosetting type paints, processes by forming a primer layer containing an ultraviolet ray absorbing agent were hitherto employed in order to improve their weather resistance, and the ultraviolet ray absorbing agent was used in an amount of 10–20% by weight of the resin forming the primer layer. Therefore, it could be thought of theoretically that, also in the case of ultraviolet ray setting type paints, the weather resistance would be improved by forming the same primer layer as used for the thermosetting type paints. This, however, was difficult in practice. That is, when a primer layer containing a relatively large amount as mentioned above of an ultraviolet ray absorbing agent was formed and an ultraviolet ray setting type paint having a good abrasion resistance was applied on the primer layer, the ultraviolet ray absorbing agent contained in the primer bleeded out in the surface layer (the layer of the ultraviolet ray setting type paint) and the interface of the primer and the surface layer in the course or process of drying or the like prior to the curing, and accordingly the curing could not be effected satisfactorily even by irradiation of strong ultraviolet ray on the surface. This would result from some inconvenience such as deterioration of the tight adhesion in the surface layer portion.

Under the circumstances, the inventors have made various investigations and found a process for obtaining polycarbonate molded articles having excellent weather resistance and excellent abrasion resistance economically, by forming on the surface of a polycarbonate molding a protective layer which does not injure the transparency and has an excellent tightly adhesive property.

SUMMARY OF THE INVENTION

Thus, the present invention provides a process for the preparation of polycarbonate molded articles having excellent weather resistance and excellent abrasion resistance, characterized in that a solution in an organic solvent of a thermoplastic acrylic (or methacrylic) polymer containing 4–8% by weight of an ultraviolet ray absorbing agent is applied on the surface of a polycarbonate molded object and dried to form a primer layer, an ultraviolet ray setting paint is applied on the primer layer and dried, and then ultraviolet ray irradiation is effected to form an abrasion resistant cured layer.

The polycarbonate molded articles consisting of three layers, which are obtained finally according to the above-mentioned process, are per se novel and valuable in various uses. Therefore, the present invention provides also a polycarbonate molded article having excellent weather resistance and excellent abrasion resistance, characterized in that a polycarbonate molded object is coated with an abrasion resistant cured layer comprising an ultraviolet ray setting paint, through a primer layer comprising a thermoplastic acrylic (or methacrylic) polymer containing 4-8% by weight of an ultraviolet ray absorbing agent.

Figure 1:
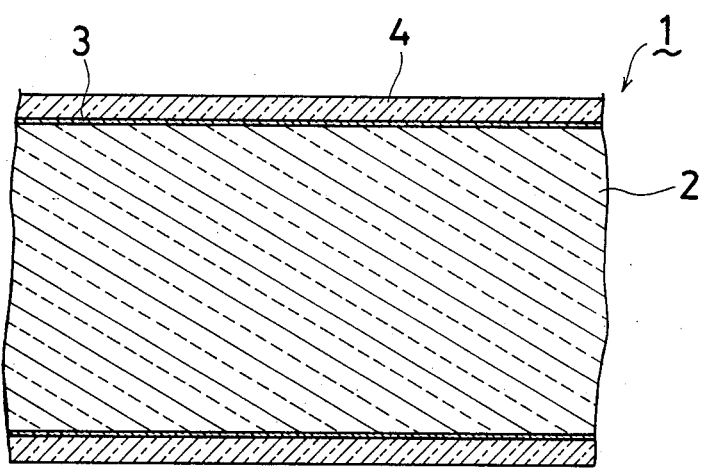
FIG. 1 is a partial sectional view of an embodiment of the polycarbonate molded articles of the present invention.

(1) ... polycarbonate sheet,
(2) ... polycarbonate molded object,
(2') ... polycarbonate hollow sheet,
(3) ... primer layer,
(4) ... cured layer, and
(21) ... rib.

PREFERRED EMBODIMENT OF THE INVENTION

The polycarbonate molded articles which are the objects of the present invention mean those molded articles whose basic resin is the so-called polycarbonate. The polycarbonates to be employed may be aliphatic polycarbonates comprising residues of aliphatic dioxy compounds, aroaliphatic polycarbonates comprising residues of aliphatic dioxy compounds containing aromatic ring or aromatic polycarbonates comprising residues of aromatic dioxy compounds, or modified polycarbonates [cf; M. Matsukane et al: "Polycarbonate Resins" (2nd edition of 30th June, 1976) published by Nikkan Kogyo Shinbun Sha of Japan]. Preferred polycarbonates are moldable ones possessing high melting and high tensile strength and are aromatic polycarbonates which are derived from 4,4'-dioxydiaryl-alkanes having the general formula:

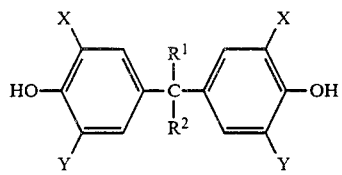

wherein X and Y are hydrogen atom, halogen atom (e.g., chlorine or bromine atom) or lower alkyl group (e.g., methyl), and $R^1$ and $R^2$ are hydrogen atom or alkyl group (e.g., methyl, ethyl, propyl, i-propyl or hexyl).

There is no special limitation on the form or shape of the molded articles. Various shapes of the molded articles, such as sheet pipe, container and the like may be selected suitably. Usually, a molded article in the form of sheet is used. For a wall material, it is favorable to use a hollow sheet of polycarbonate with ribbed structure.

The portion of such polycarbonate molded objects, which is coated with the abrasion resistant cured layer through the primer layer, may be decided in accordance with the shape and the use of the moldings, though it is essential to coat at least such portion as might be injured or affected by external circumstances. Therefore, the molded objects may be coated wholly or partially. For instance, whole coating is suitable for containers, and in the case of sheets the coating may be applied on one side or both sides thereof depending on the use of the sheets.

As examples of the thermoplastic acrylic (or methacrylic) polymer which is used to form the primer layer in accordance with the present invention, there can be mentioned polyalkyl acrylates or metacrylates such as polymethyl acrylate, polyethyl methacrylate, polybutyl methacrylate; or their copolymer such as methyl methacrylate/methyl acrylate copolymer methyl methacrylate/ethyl acrylate copolymer, methyl methacrylate/butyl acrylate copolymer, methyl methacrylate/butyl acrylate/styrene copolymer, and the like. Besides these polymers, any polymer comprising acrylic (or methacrylic) ester residue, which is adhesive to polycarbonates and flexible to some extent, can be used. As regards the degree of polymerization, polymers having a weight average molecular weight of 40,000-70,000 are used usually and those usable as cold-dry type acrylic resin (for lacquer) are suitable.

As examples of the ultraviolet ray absorbing agent to be contained in the above-mentioned polymer, there can be mentioned ultraviolet ray absorbing agents of benzophenone series such as 2-hydroxy-4-methoxybenzophenone, 2-hydroxy-4-octoxybenzophenone, etc., ultraviolet ray absorbing agents of triazole series such as 2-(2'-hydroxy-5'-methylphenyl) benzotriazole, 2-(2'hydroxy-5'-t-octylphenyl) benzotriazole, etc., ultraviolet ray absorbing agents of salicylic acid ester series such as phenyl salicylate, 4-t-butylphenyl salicylate, etc. and the like. Among these, ultraviolet ray absorbing agents of benzotriazole series are preferably used. It is required that the content of such ultraviolet ray absorbing agent in the polymer is 4-8% by weight. Such content is the most characteristic point of the present ivnention. When the amount is more than 8% by weight, hardening of the ultraviolet ray setting paint in the surface layer is affected and becomes insufficient, and accordingly the resulting surface layer is insufficient in steel wool-resisting property, water resisting property, tightly adhesive property and the like. In contrast, when the amount is less than 4% by weight, the resulting surface layer is insufficient in weather-proofing property though it is sufficient in abrasion resisting property. The amount of addition is preferably 5-7% by weight.

At first, a primer layer comprising the above-mentioned thermoplastic polymer containing the above-mentioned ultraviolet ray absorbing agent is formed on a polycarbonate molded object. The formation is effected by applying a solution in an organic solvent of the thermoplastic polymer and the ultraviolet ray absorbing agent to the polycarbonate molded object and drying it subsequently. As said organic solvent, those solvents which do not injure the transparency of the polycarbonate molded object and the primer layer and still dissolve the thermoplastic polymer and the ultraviolet ray absorbing agent are used, and usually a mixed solvent consisting of an aromatic, ketonic, esteric and/or etheric solvent and an alcoholic solvent is suitable used. As the above aromatic solvent, benzene, toluene, xylene and the like are mentioned. As the ketonic solvent, methyl ethyl ketone, methyl isobutyl ketone and the like are mentioned. As the esteric solvent, ethyl acetate, butyl acetate and the like are mentioned. As the etheric solvent, butyl cellosolve, ethyl cellosolve and the like are mentioned. As the alcoholic solvent, isopropyl alcohol, butyl alcohol and the like are mentioned.

In order to obtain a surface layer having properties or quality as desired, the primer layer is required to be thin, more particularly, to have a thickness of about 10 m or less. When the thickness is more than 10 nm, various inconveniences such as, cracking of the surface layer due to the unvolatilized, remaining solvent, bleeding out in the surface layer of the ultraviolet ray absorbing agent, lowering of the adhesion onto the polycarbonate molded object (substrate), cracking of the surface layer by bending or cutting of the molding, and the like, may occur and the moldings obtained lose their utility. Usually, it is preferred to adjust the thickness to about 4–10 μm, especially to about 5–8 μm.

On the above-mentioned primer layer, a cured layer of an ultraviolet ray setting paint is formed. The formation of the cured layer is effected by applying the ultraviolet ray setting paint on the above-mentioned primer layer dried completely, drying the paint completely, and then irradiating ultraviolet ray to cause curing by cross-linking.

The cured layer formed must be abrasion resistant. Therefore, an ultraviolet ray setting paint which is capable of forming such cured layer is selected and used. As such ultraviolet ray setting paint, ultraviolet ray setting paints of the so-called acrylic series which comprise a polyfunctional acrylic oligomer, a photoreaction initiator (photosensitizer), a monomer, a leveling agent, a solvent, etc. are suitable. As said acrylic oligomer, there can be mentioned polyester acrylate oligomer, polyurethane acrylate oligomer, epoxy acrylate oligomer, polyol acrylate oligomer, polyether acrylate oligomer and the like. Among these, an ultraviolet ray setting paint comprising a polyurethane acrylate oligomer is preferably used in view of its weather resistant property, flexibility and the like. As the above-mentioned photoreaction initiator, photosensitizers of the carbonyl compound series, the sulfur compound series, the azo compound series and the peroxide compound series are mentioned. As the monomer, an acrylic monomer having a high radical polymerization ability is suitable. As example of the leveling agent, silicone compounds are mentioned. As example of the solvent, ethyl acetate, toluene and ethers are mentioned.

For application of the primer and the ultraviolet ray setting paint, processes of painting by spray, dipping, flow-coating, curtain-coating, roll-coating, brush-coating or the like may be employed. Although drying is performed under such conditions as enable solvents to evaporate, the drying effected after the application of the ultraviolet ray setting paint on the primer layer and before the curing of the setting paint is requested to be performed so as to make the solvents evaporate completely. In general, drying at 60°–120° C. for 10–3 minutes is sufficient. When some solvent remains in the primer layer and the surface layer, the surface layer formed will be inferior in its water resisting property and abrasion resisting property. A preferable embodiment is a process wherein a primer paint comprising an acrylic polymer compounded with an ultraviolet ray absorbing agent is applied on the surface of a polycarbonate molding, a primer layer is formed on the molding by heat drying at 80°–120° C. for 10–3 minutes after air drying for several minutes, an ultraviolet ray setting paint is applied on the primer layer formed on the polycarbonate molding, the resulting molding is dried by heating at 80°–120° C. for 10–3 minutes after air drying for several minutes, and then, after cooling the molding, ultraviolet ray irradiation is effected to form a cured surface layer thereon by cross-linking.

It is usually preferred to adjust the thickness of the cured layer to about 5–10 μm, in view of possible cracking by bending, surface hardness, abrasion property and other respects.

The polycarbonate molded articles thus obtained have excellent surface properties such as excellent abrasion resistance property, high surface hardness and highly tight adhesion on the polycarbonate substrate, and at the same time have excellent weather resistant property. They are preferred to be substantially transparent. They can be used outdoors for a long period of time, without yellowing.

Therefore, the polycarbonate molded articles obtained are valuable in various uses. They are valuable particularly as wall material for greenhouse, ceiling material, partition wall material, wall material for sunroom, substitute for windbreak glass, and the like, utilizing their transparency.

Figure 2:
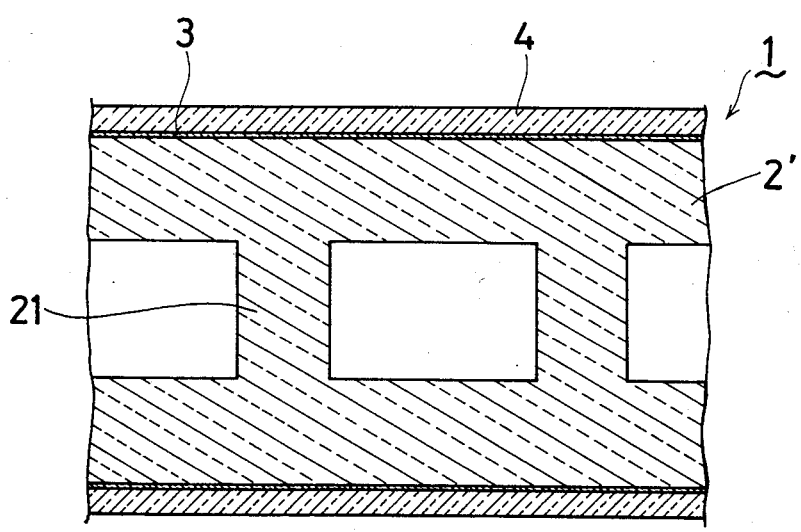
FIG. 2 is a partial sectional view of another embodiment.

Embodiments of the polycarbonate molded articles of the present invention are shown in FIG. 1 and FIG. 2. FIG. 1 shows a polycarbonate sheet (1) consisting of a polycarbonate molded object (2) in the form of sheet and an abrasion resistant cured layer (4) comprising an ultraviolet ray setting paint, which is formed on the surface of the polycarbonate molded object through a primer layer (3) having a thickness of 10 μm or less which comprises a thermoplastic acrylic (or methacrylic) polymer containing 4–8% by weight of an ultraviolet ray absorbing agent. FIG. 2 shows a polycarbonate sheet (1) of the present invention, wherein a polycarbonate hollow sheet (2') having rib (21) is used.

It is not clear why the weather resistant property is significantly improved by preparing the surface layer comprising an ultraviolet ray setting paint after forming the primer layer of the present invention containing 4–8% by weight of an ultraviolet ray absorbing agent, notwithstanding the fact that a surface layer comprising the same ultraviolet ray setting paint, which is formed directly without interposition of such primer layer, is very inferior in the weather proofing property. However, it is presumed that migration of the ultraviolet ray absorbing agent contained in the primer layer into the surface layer does not substantially occur until the surface layer is formed, and so the ultraviolet ray setting proceeds sufficiently, the migration of the ultraviolet ray absorbing agent contained in the primer layer into the surface layer occurs slowly after the surface layer is formed and improves the weather resistant property of the surface layer, and as a result a molded article having excellent abrasion resistant property and excellent weather resistant property is obtained.

Hereinafter, the present invention is further explained in detail by giving Examples and Comparative Examples. The methods employed for the test of quality in Examples are described in the following:

(1) Appearance

| judged with the eye | | |
|---|---|---|
| Standard of the judgement | O | Good |
| | Δ | cracking on the painted layer |
| | X | peeling of the painted layer |

(2) Steel wool test

The surface of the painted layer was scoured with a steel wool of #0000 by making 10 return trips, while holding down the film softly. Then, the degree of injury on the surface of the painted layer was judged according to the following standard and the abrasion resistant property was evaluated.

A ... not injured
B ... scarcely injured
C ... innumerably injured

(3) Adhesive property

On the painted layer, 100 oval-shaped grains were formed and a cellophane tape was adhered tightly. Then, the cellophane tape was peeled off abruptly in the right-angled direction. The number of those grains remained thereby without being peeled off was expressed in relation of the total number of the grains, in order to evaluate the adhesive property.

(4) Weather resistance test

Using a sunshine weatherometer (Suga tester, WE-SuN-HC type), the sample was subjected to irraciation for a prescribed period of time, and the various properties were evaluated.

O ... less yellowing, and the painted layer showed no abnormality
Δ ... cracking occurred.in the painted-layer
X ... the painted layer was peeled off

(5) Hot water resisting test

The sample was dipped in hot water of 80° C. for 1 hour, and then various properties were evaluated.

EXAMPLE 1

A cold-dry type acrylic resin (glass transition temperature: 77° C., methyl methacrylate/butyl acrylate copolymer) was dissolved in a solvent consisting of ethyl cellosolve 10 wt %, ethyl acetate 15 wt %, isopropyl alcohol 50 wt %, toluene 10 wt % and methyl ethyl ketone 15 wt %, to prepare a paint of 20 wt %.

Next, an ultraviolet ray absorbing agent (of benzotriazole series, Tinuvin P from Ciba-Geigy: 2-[2'-hydroxy-5'-methylphenyl]benzotriazole) was compounded with the above paint in a ratio shown in Table 1, to prepare a primer solution. The primer solution was applied using a bar-coater to the surface of a polycarbonate resin sheet, while adjusting the application so that a primer layer haing a thickness of 7-10 μm may be obtained after drying. After application of the primer, air drying was effected for about 3 minutes and further drying at 100° C. for 7 minutes was effected in a hot-air drier.

Then, to the polycarbonate sheet treated with the primer was applied using a bar-coater an ultraviolet ray setting paint of acrylate series [a paint consisting of 40 wt % of the main ingredient which in turn consists of 30 parts of styrene, 40 parts of pentaerythritol triacrylate, 30 parts of diethylhexyl acrylate and 4 parts of Irgacure 651 (from Ciba-Geigy), and 10 wt % of ethyl cellosolve, 20 wt % of toluene, 20 wt % of isopropyl alcohol and 10 wt % of ethyl acetate, as solvents], so that a top coat layer having a thickness of 7-10 μm may be obtained after drying. After air drying for about 2 minutes, heat drying at 90° C. was effected for 7 minutes. Then, after cooling at room temperature, irradiation of ultraviolet ray was effected. All the produts were transparent. The conditions for the ultraviolet ray setting were as follows:

High pressure mercury lamp : 120 W/cm 2 lamps
Height: 15 cm
Reflection plate: Parallel reflection plate made of aluminum
Passing speed under lamp: 3 m/minute
Seconds of ultraviolet ray irradiation: about 0.8 second As is apparent from Table 1, it is recognized that there is a great difference in abrasion resisting property, hot water resisting property and weather resistant property, depending on the amount of ultraviolet ray absorbing agent contained in the primer. That is, it has become clear that when the amount is (1) 0% by weight, the weather resistant property is very inferior,
(2) 2-4% by weight, the weather resistant, property is somewhat improved,
(3) 6-8% by weight, the weather resistant, property is 4 times or more of that in the case of 0% by weight, but the abrasion-resisting property is somewhat inferior, and
(4) 10% by weight or more, the abrasion-resisting property is significantly inferior.

Thus, it is clear that the desirable amount of the ultraviolet ray absorbing agent is 4-8%.

TABLE 1

| No. | The amount of ultraviolet ray absorbing agent contained in the primer (wt %) | Ordinary state | | | Hot water resisting property | | | Weather resistant property (Irradiation time by sunshine weatherometer) | | | | |
|---|---|---|---|---|---|---|---|---|---|---|---|---|
| | | Appearance | Steel wool test | Adhesive property | Appearance | Steel wool test | Adhesive property | 250 hrs. | 500 hrs. | 750 hrs. | 1000 hrs. | 1500 hrs. |
| 1 | without primer | O | C | — | O | C | — | X yellowing | X | X | X | X |
| 2 | 0 | O | A | 100/100 | O | A | 100/100 | O | X | X | X | X |
| 3 | 2 | O | A | 100/100 | O | A | 100/100 | O | O | Δ | X | X |
| 4 | 4 | O | A | 100/100 | O | A | 100/100 | O | O | O | O | Δ |
| 5 | 6 | O | A | 100/100 | O | A | 100/100 | O | O | O | O | O |
| 6 | 8 | O | B | 100/100 | O | B | 98/100 | O | O | O | O | O |
| 7 | 10 | O | C | 78/100 | X | C | 0/100 | Not tested, because of inferior initial property | | | | |

EXAMPLE 2

COMPARATIVE EXAMPLE 2

A cold-dry type acrylic resin (glass transition temperature: 66° C., based on methyl methacrylate and butyl methacrylate) was dissolved in a solvent consisting of ethyl cellosolve 10 wt %, isobutanol 25 wt %, diacetone alcohol 30 wt %, toluene 10 wt %, methyl ethyl ketone 20 wt % and isopropyl alcohol 5 wt %, to prepare a paint of 20%.

Next, an ultraviolet ray absorbing agent (of benzotriazole series, Tinuvin 234 from Ciba-Geigy) was compounded with the above paint in a ratio shown in Table 2, to prepare a primer solution. The primer solution was applied using a bar-coater to the surface of a polycarbonate resin sheet, while adjusting the application so that a primer layer having a thickness of 7– μm may be obtained after drying. After application of the primer, air drying was effected for about 3 minutes and further drying at 100° C. for 7 minutes was effected in a hot-air drier.

Then, to the polycarbonate resin sheet treated with the primer was applied using a bar-coater an ultraviolet ray setting paint consisting of 40 wt % of the main ingredient which in turn consists of 50 parts of a urethane acrylate of hexamethylene diisocyanate/ethyl acrylate/1,6-hexanadiol/adipic acid series, 30 parts of pentaerythritol triacrylate, 20 parts of butyl acrylate and 4.0 parts of Irgacure 651 (from Ciba-Geigy), 10 wt % of ethyl cellosolve, 20 wt % of isopropyl alcohol and 10 wt % of ethyl acetate, so that a top-coat layer having a thickness of 7–10 μm may be obtained after drying. After air drying for about 2 minutes, heat drying at 90° C. for 7 minutes was effected. Then, after cooling at room temperature, curing by ultraviolet ray was effected. The conditions for the curing by ultraviolet ray were the same as those employed in Example 1.

The same tendency as in Example 1 was observed, and the weather resistant property was significantly improved as the amount of the ultraviolet ray absorbing agent contained in the primer was 6–8 wt %.

cracking in the surface layer by bending or cutting of the hardened molded articles

COMPARATIVE EXAMPLE 4

A paint containing 12 wt % of solid matters was prepared in the same manner as Example 2, using methyl methacrylate as the basic resin of primer. To this paint, an ultraviolet ray absorbing agent of benzophenone series (Seasoab 102 from Shipuro Kasei of Japan) was added in an amount of 30 wt % in regard to the solid matters, and the same operations as Example 2 were performed.

Hardening of the surface layer was recognized. However, the surface layer not adhered tightly to the primer layer was peeled off.

EXAMPLE 5

COMPARATIVE EXAMPLE 5

A primer was prepared in the same manner as Example 1, using methyl methacrylate/butyl methacrylate as the basic resin and compounding therewith an ultraviolet ray absobing agent of benzotriazole series (Seasoab 709 from Shipuro Kasei of Japan) in a ratio as shown in Table 3, and subjected to the tests. As regards the ultraviolet ray setting paint, it was also same as Example 1.

As is clear from Table 3, it was recognized that the weather-proofing property was improved significantly up to 4–5 times by adding 4 wt % of the ultraviolet ray absorbing agent.

TABLE 2

| No. | The amount of ultraviolet ray absorbing agent contained in the primer (wt %) | Ordinary state | | | Weather resistant property |
|---|---|---|---|---|---|
| | | Appearance | Steel wool test | Adhesive property | Tightly adhesive property of the painted layer |
| 1 | 0 | O | A | 100/100 | Painted layer was peeled off at 250–300 hrs. |
| 2 | 2 | O | A | 100/100 | Painted layer was peeled off at 600 hrs. |
| 3 | 6 | O | A | 100/100 | Painted layer was peeled off at 1600 hrs. |
| 4 | 8 | O | B | 100/100 | Painted layer was peeled off at 2000 hrs. |
| 5 | 14 | O | C | 96/100 | Not tested, because of inferior initial state |

EXAMPLE 3

Using an ultraviolet ray absorbing agent of benzophenone series (Seasoab 102 from Shipure Kasei), the same test as Example 1 was performed.

The tendency was almost same as Example 1. However, in the weather resistance test, yellowing and peeling off of the painted film occurred by the time period of about ⅔ of that in the case of using an ultraviolet ray absorbing agent of benzotriazole series.

COMPARATIVE EXAMPLE 3

Since a process of cutting the ultraviolet ray reaching the surface of polycarbonate by applying the primer thickly could be thought of, such process was examined using the same primer as used in Example 1. That is, the thickness of the primer was adjusted to 2 times (14–20 μm) of that employed in Example 1, and the same tests as Example 1 were effected. The moldings so obtained were poor in practical utility Because they were liable to cause cracking due to diffusion of the solvent contained in the surface layer into the primer layer and also

TABLE 3

| Glass transition point of the basic resin | Amount of the ultraviolet ray absorbing agent contained (wt %) | Weather resistant property (Time requested until the peeling off of the painted layer) |
|---|---|---|
| 31 | 0 | 300 hrs. |
| | 2 | 800 |
| | 4 | 1200 |
| 66 | 0 | 300 |
| | 2 | 1000 |
| | 4 | 1500 |
| 77 | 0 | 300 |
| | 2 | 800 |
| | 4 | 1200 |

What we claimed is:

1. A polycarbonate molded article having excellent weather resistance and excellent abrasion resistance in which polycarbonate molded object is coated with an abrasion resistant cured layer comprising an ultraviolet ray setting paint, through a primer layer consisting essentially of a thermoplastic acrylic or methacrylic polymer and 4–8% by weight of an ultraviolet ray absorbing agent.

2. A molded article as claimed in claim 1, wherein the primer layer has a thickness of about 10 μm or less.

3. A molded article as claimed in claim 1, wherein the thermoplastic acrylic or methacrylic polymer is selected from the following group; a polyalkyl acrylate such as polymethyl acrylate, polyethyl methacrylate, polybutyl methacrylate; or its copolymer such as methyl methacrylate/methyl acrylate copolymer, methyl methacrylate/ethyl acrylate copolymer, methyl methacrylate/butyl acrylate copolymer and methyl methacrylate/butyl acrylate/syrene copolymer.

4. A molded article as claimed in claim 1, wherein the ultraviolet ray absorbing agent is a benzophenone selected from the group consisting of 2-hydroxy-4-methoxybenzophenone and 2-hydroxy-4-octoxybenzophenone; a triazole selected from the group consisting of 2-(2'-hydroxy-5'-methylphenyl)benxotriazole, and 2-(2'hydroxy-5'-t-octcylphenyl)benzotriazole; or a salicylic acid ester selected from the group consisting of phenyl salicylate and 4-t-butylphenyl salicylate.

5. A molded article as claimed in claim 1, wherein the thermoplastic acrylic or methacrylic polymer contains 5–7% by weight of the ultraviolet ray absorbing agent.

6. A molded article as claimed in claim 1, wherein the cured layer has a thickness of about 5–10 μm.

7. A molded article as claimed in claim 1, wherein the ultraviolet ray setting paint comprises a polyfunctional acrylic oligomer, a photoesensitizer, a monomer a leveling agent and a solvent.

8. A molded article as claimed in claim 7, wherein the polyfunctional acrylic oligomer is selected from the following group a polyester acrylate oligomer, polyurethane acrylate oligomer, epoxy acrylate oligomer, polyol acrylate oligomer and polyether acrylate oligomer.

9. A molded article as claimed in claim 1, which is substantially transparent.

10. A molded article as claimed in claim 1, wherein the polycarbonate molded object is in the form of sheet and its one or both surface is coated with the abrasion resistant cured layer through the primer layer.

11. A process for the preparation of polycarbonate molded articles having excellent weather resistance and abrasion resistance, in which a solution in an organic solvent of a thermoplastic acrylic or methacrylic polymer containing and 4–8% by weight of an ultraviolet ray absorbing agent is applied on the surface of a polycarbonate molded object and dried to form a primer layer, an ultraviolet ray setting paint is applied on the primer layer and dried, and then ultraviolet ray irradiation is effected to forman abrasion resistant cured layer.

12. A process as claimed in claim 11, wherein the primer layer has a thickness of about 10 μm or less.

13. A process as claimed in claim 11, wherein the cured layer applied has a thickness of about 5–10 μm.

* * * * *